(12) United States Patent
Galpin et al.

(10) Patent No.: US 10,999,603 B2
(45) Date of Patent: May 4, 2021

(54) METHOD AND APPARATUS FOR VIDEO CODING WITH ADAPTIVE CLIPPING

(71) Applicant: InterDigital VC Holdings, Inc., Wilmington, DE (US)

(72) Inventors: Franck Galpin, Thorigne-Fouillard (FR); Fabien Racape, Rennes (FR); Philippe Bordes, Laille (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/333,519

(22) PCT Filed: Sep. 11, 2017

(86) PCT No.: PCT/EP2017/072773
§ 371 (c)(1),
(2) Date: Mar. 14, 2019

(87) PCT Pub. No.: WO2018/050601
PCT Pub. Date: Mar. 22, 2018

(65) Prior Publication Data
US 2019/0261020 A1 Aug. 22, 2019

(30) Foreign Application Priority Data
Sep. 15, 2016 (EP) .................. 16306176

(51) Int. Cl.
*H04N 19/117* (2014.01)
*H04N 19/60* (2014.01)
(Continued)

(52) U.S. Cl.
CPC .......... *H04N 19/60* (2014.11); *H04N 19/117* (2014.11); *H04N 19/186* (2014.11); *H04N 19/80* (2014.11)

(58) Field of Classification Search
None
See application file for complete search history.

(56) References Cited

U.S. PATENT DOCUMENTS

| 8,184,710 B2 | 5/2012 | Srinivasan et al. |
| 8,730,130 B1 | 5/2014 | Pray et al. |

(Continued)

FOREIGN PATENT DOCUMENTS

| WO | WO0064189 | 10/2000 |
| WO | WO2012095317 | 7/2012 |
| WO | WO2016055001 | 4/2016 |

OTHER PUBLICATIONS

Hu et al., Adaptive Quantization—Parameter Clip Scheme for Smooth Quality in H264AVC, IEEE Transactions on Image Processing, vol. 21, No. 4, Apr. 2012.

(Continued)

*Primary Examiner* — Shadan E Haghani
(74) *Attorney, Agent, or Firm* — Xiaoan Lu

(57) ABSTRACT

In a particular implementation, a clipping bound may be different from the signal bound. For example, to derive the upper clipping bound, a reconstructed sample value corresponding to original sample value Y is estimated to be $Y+\Delta y$. Thus, for a candidate upper clipping bound x, the difference between the clipped value and the original value is calculated as $\min(Y+\Delta y, x)-Y$. The distortions using different candidate clipping values around signal bound M may be tested. The test starts with signal bound M and moves towards smaller values. The distortion may first decrease (or maintain the same) and then increase, and the turning point is chosen as upper clipping bound M'. Similarly, the lower clipping bound m' can be chosen. For more effective clipping, the color components may be transformed such that the (Continued)

transformed color components may be more tightly enclosed by a box defined by the clipping bounds.

20 Claims, 10 Drawing Sheets

(51) Int. Cl.
*H04N 19/186* (2014.01)
*H04N 19/80* (2014.01)

(56) References Cited

U.S. PATENT DOCUMENTS

| | | | |
|---|---|---|---|
| 9,225,991 B2* | 12/2015 | Tourapis | H04N 19/122 |
| 10,158,836 B2* | 12/2018 | Hsieh | H04N 19/149 |
| 2004/0170319 A1 | 9/2004 | Maurer | |
| 2011/0305277 A1 | 12/2011 | Fu et al. | |
| 2013/0083855 A1 | 4/2013 | Kottke | |
| 2019/0014370 A1 | 1/2019 | Weber et al. | |
| 2019/0104330 A1 | 4/2019 | Dore et al. | |
| 2019/0289320 A1* | 9/2019 | Chuang | H04N 19/563 |

OTHER PUBLICATIONS

Chang et al., "TE10 Subtest3: Controlled Clipping", Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010.
Gaplin et al., "Adaptive Clipping in JEM", Data Compression Conference, 2017.
Chang et al., "CE8 Subtest3: Controlled Clipping", hmmJoint Collaborative Team on Video Coding (JCT-VC) of ITU-T SG16 WP3 and ISO/IEC JTC1/SC29/WG11, 4th Meeting: Daegu, KR, Jan. 20-28, 2011.
Galpin et al, "Adaptive Clipping in JEM2.0", Joint Video Exploration Team (JVET) of ITU-T SG 16 WP 3 and ISO/IEC JTC 1/SC 29/WG 11, 3rd Meeting: Geneva, CH, May 26-Jun. 1, 2016.
Li et al., "Non-CE4: Clipping of Transformed Coefficients before De-quantization", Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012.
R. Starosolski: "New Simple and Efficient Color Space Transformations for Lossless Image Compression", Jul. 2014.
Heng Sun et al: "Adaptive Bit Allocation Scheme for Rate Control in High Efficiency Video Coding with Initial Quantization Parameter Determination", Nov. 2014.

* cited by examiner

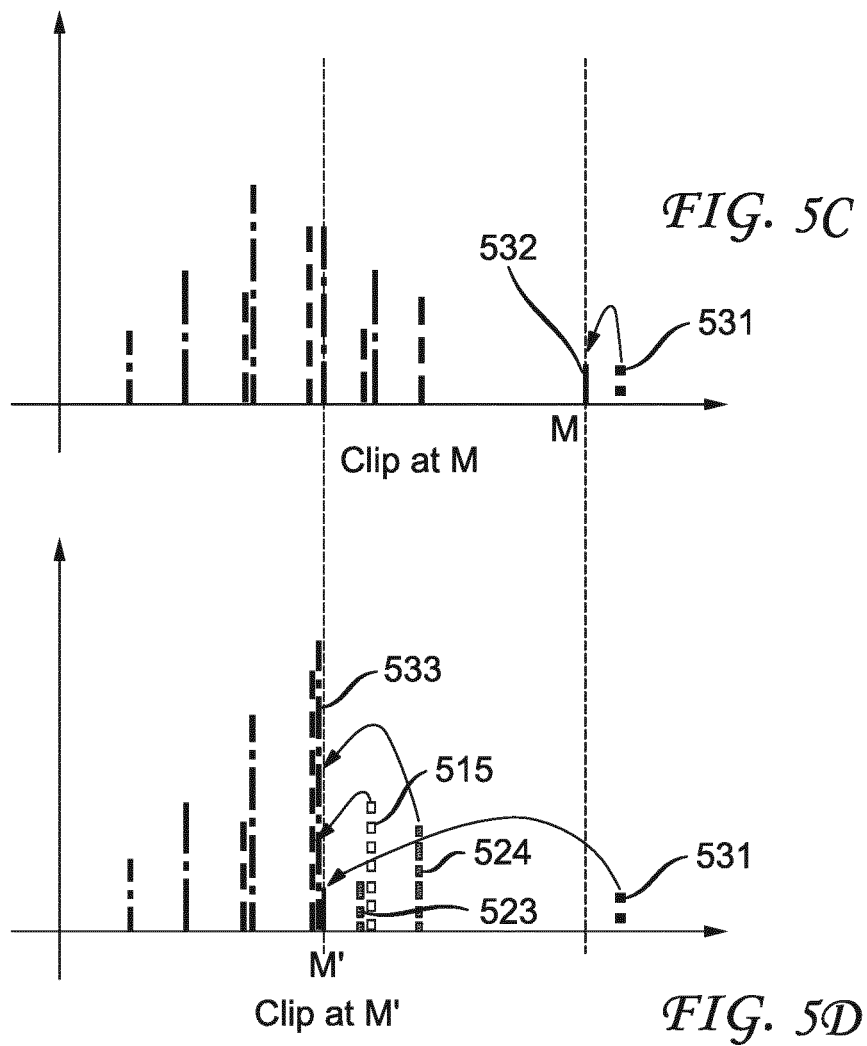

METHOD AND APPARATUS FOR VIDEO CODING WITH ADAPTIVE CLIPPING

This application claims the benefit, under 35 U.S.C. § 371 of International Application No. PCT/EP17/072773, filed Sep. 11, 2017, which was published on Mar. 22, 2018, which claims the benefit of European Patent Application No. EP16306176.5 filed Sep. 15, 2016.

TECHNICAL FIELD

The present embodiments generally relate to a method and an apparatus for video encoding and decoding, and more particularly, to a method and an apparatus for video encoding and decoding with adaptive clipping.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized and entropy coded. To reconstruct the video, the compressed data is decoded by inverse processes corresponding to the prediction, transform, quantization and entropy coding.

During various operations in a video compression system, the video data may exceed the data range used to represent the video data. To avoid possible data inversion, for example, a high value exceeding the range of an 8-bit representation may be inadvertently treated as a low value if only the lower eight bits are retained, the video data is usually clipped to a proper range.

SUMMARY

According to a general aspect of the present principles, a method for processing video data is presented, comprising: accessing a video signal having a first color component, a second color component, and a third color component in a first color space; transforming the second color component and the third color component into a second color space; clipping sample values of the second color component and the third color component in the second color space; and transforming the clipped sample values of the second color component and the third color component from the second color space to the first color space. The transformed clipped sample values can be used for encoding or decoding the video signal.

According to another general aspect of the present principles, a bitstream is formatted to include an encoding section of a video signal having a first color component, a second color component, and a third color component in a first color space; and a set of parameters used for transforming the second color component and the third color component into a second color space, wherein sample values of the first color component are clipped in the first color space, the clipped sample values of the first color component being used for encoding or decoding the video signal, wherein sample values of the second color component and the third color component are clipped in the second color space, and wherein the clipped sample values of the second color component and the third color component are transformed from the second color space to the first color space. The transformed clipped sample values of the second color component and the third color component can be used for encoding or decoding the video signal.

Sample values of the first color component may or may not be transformed. When sample values in the first color component are less correlated with sample values in the second color component and the third color component, the clipping of the first color component is performed in the first color space without transformation. In one example, the first, second and third color components are Y, U, V, respectively.

The transforming can be based on PCA (Principal Component Analysis), and the parameters for the transforming may be encoded into a bitstream or decoded from the bitstream, at an encoder or decoder. The clipping may be performed using both an upper clipping bound and a lower clipping bound, or one of those.

To determine the clipping bounds, the encoder may determine one or more distortions, using one or more values adjacent to a signal bound as corresponding candidate clipping bounds, wherein each of the one or more distortions is based on a corresponding candidate clipping bound, and wherein the distortions first decrease or maintain the same and then increase, as a distance between the candidate clipping bound and the signal bound increases; and determine the candidate clipping bound where the distortions start to increase as a clipping bound for at least one of the first, second and third color components of the video signal. The method of determining the clipping bound may be used together with or separately from the clipping in the transformed space. The signal bound may be one of an upper signal bound and a lower signal bound.

The one or more distortions may be calculated based on a difference between original values of the video signal and reconstructed values of the video signal after being clipped by the corresponding candidate clipping bound, based on a histogram of the video signal. When the actual reconstructed values are not available, the reconstructed values of the video signal can be estimated based on a quantization parameter.

The present embodiments also provide an apparatus for processing video data according to the methods described above.

The present embodiments also provide a computer readable storage medium having stored thereon instructions for processing video data according to the methods described above.

The present embodiments also provide a computer readable storage medium having stored thereon a bitstream generated according to the methods described above.

The present embodiments also provide an apparatus for transmitting the bitstream generated according to the methods described above.

BRIEF DESCRIPTION OF THE DRAWINGS

FIG. 5C and FIG. 5D illustrate exemplary resulting histograms based on different upper clipping bounds.

DETAILED DESCRIPTION

Figure 1:
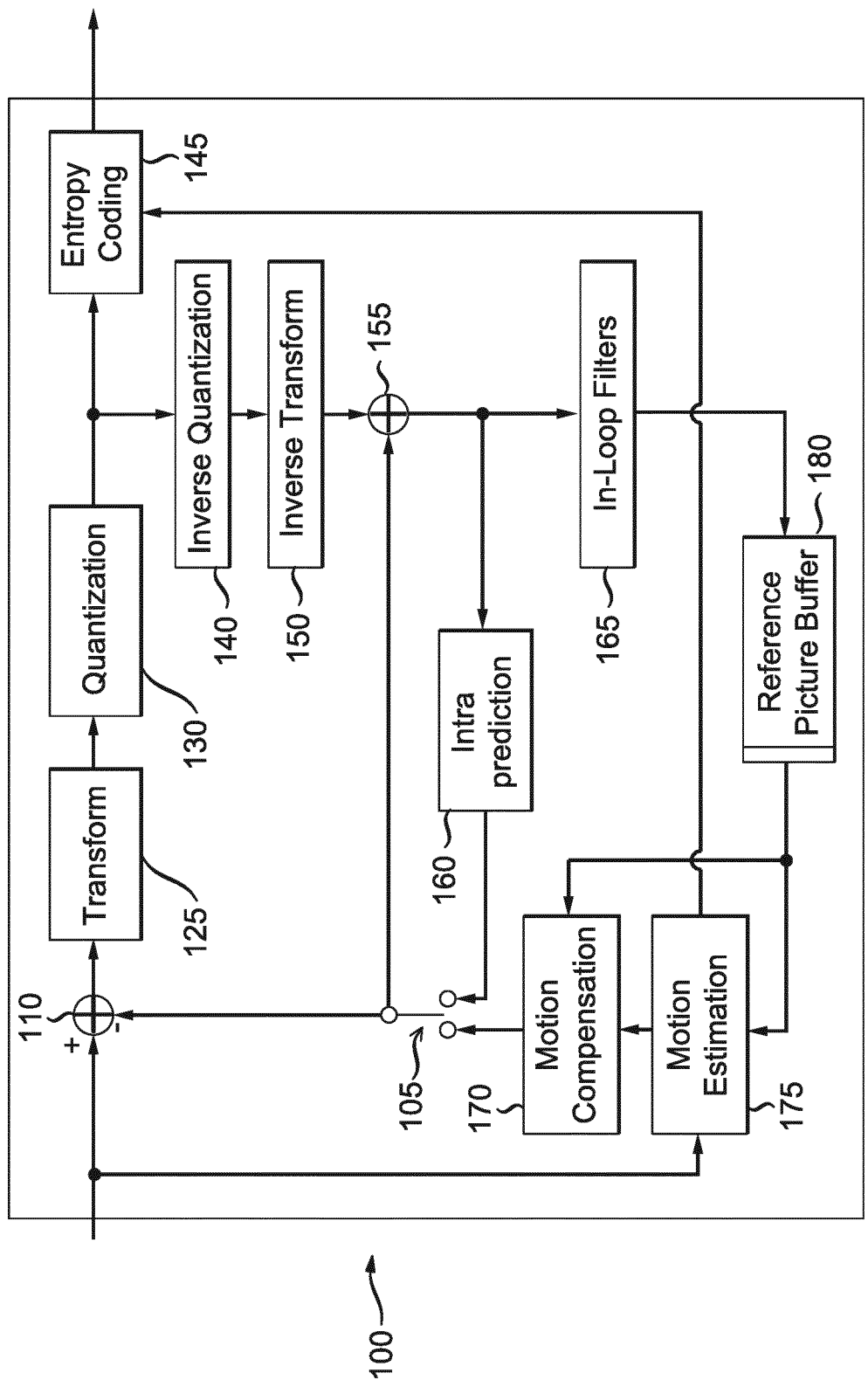
FIG. 1 illustrates a block diagram of an exemplary HEVC (High Efficiency Video Coding) video encoder.

FIG. 1 illustrates an exemplary HEVC encoder 100. To encode a video sequence with one or more pictures, a picture is partitioned into one or more slices where each slice can include one or more slice segments. A slice segment is organized into coding units, prediction units and transform units.

In the present application, the terms "reconstructed" and "decoded" may be used interchangeably. Usually but not necessarily the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated block of all encoded color components (Y, Cb, Cr, or monochrome), syntax elements and prediction data that are associated with the block (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock, a partition and a sub-block as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar and 33 angular prediction modes. The intra prediction reference is reconstructed from the row and column adjacent to the current block. The reference extends over two times the block size in horizontal and vertical direction using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed.

The motion information (i.e., motion vector and reference picture index) can be signaled in two methods, namely, "merge mode" and "advanced motion vector prediction (AMVP)."

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD.

In HEVC, the precision of the motion information for motion compensation is one quarter-sample (also referred to as quarter-pel or ¼-pel) for the luma component and one eighth-sample (also referred to as ⅛-pel) for the chroma components. A 7-tap or 8-tap interpolation filter is used for interpolation of fractional-sample positions, i.e., ¼, ½ and ¾ of full sample locations in both horizontal and vertical directions can be addressed for luma.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO filtering to reduce encoding artifacts. The filtered image is stored at a reference picture buffer (180).

Figure 2:
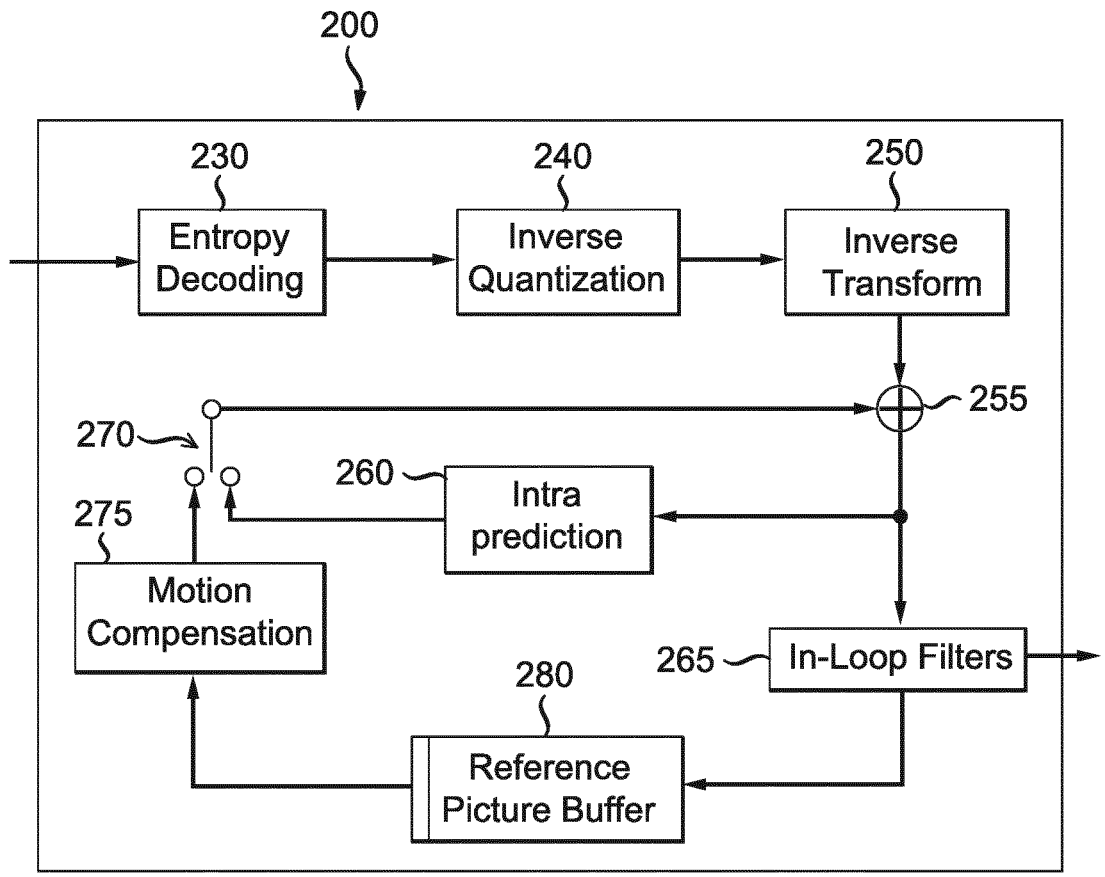
FIG. 2 illustrates a block diagram of an exemplary HEVC video decoder.

FIG. 2 illustrates a block diagram of an exemplary HEVC video decoder 200. In the exemplary decoder 200, a bitstream is decoded by the decoder elements as described below. Video decoder 200 generally performs a decoding pass reciprocal to the encoding pass as described in FIG. 1, which performs video decoding as part of encoding video data.

In particular, the input of the decoder includes a video bitstream, which may be generated by video encoder 100. The bitstream is first entropy decoded (230) to obtain transform coefficients, motion vectors, and other coded information. The transform coefficients are de-quantized (240) and inverse transformed (250) to decode the prediction residuals. Combining (255) the decoded prediction residuals and the predicted block, an image block is reconstructed. The predicted block may be obtained (270) from intra prediction (260) or motion-compensated prediction (i.e., inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

To avoid data overflow or underflow, clipping is specified in various processes in an HEVC decoder. Different clipping functions are defined in HEVC, for example:

$$ClipY(x) = Clip3(0, (1 << BitDepthY) - 1, x)$$

$$ClipC(x) = Clip3(0, (1 << BitDepthC) - 1, x) \quad (1)$$

where Y and C denote the luma and chroma components, respectively, BitDepthY and BitDepthC are the internal bit depths (for example 8 or 10) for the luma and chroma, respectively, and Clip3 is a function to clip a value z between two bounds x and y:

$$Clip3(x, y, z) = \begin{cases} x; & z < x \\ y; & z > y \\ z; & \text{otherwise} \end{cases} \quad (2)$$

The clipping may be applied during or after various operations, for example, at or after weighted prediction, prediction, intra prediction filter, adaptive loop filter (ALF), deblocking filter, SAO filter and when the decoded residual is added to the prediction. Additionally, to further improve the performance of HEVC, clipping can also be applied at PDPC (Position dependent intra prediction combination) as developed in the reference software JEM (Joint Exploration Model) by the Joint Video Exploration Team (JVET).

The clipping process is typically done by:

$$x_c = clip(x) = min(B_U, max(B_L, x)) \quad (3)$$

where $B_L$ and $B_U$ are the lower and upper bounds of clipping respectively, and value x is clipped to value $x_c$ within the range of $B_L$ to $B_U$. For example, default clipping bounds can be $B_L=0$ and $B_U=255$ for an 8-bit IBD (Internal Bith Depth), and $B_L=0$ and $B_U=1023$ for a 10-bit IBD.

Figure 3:
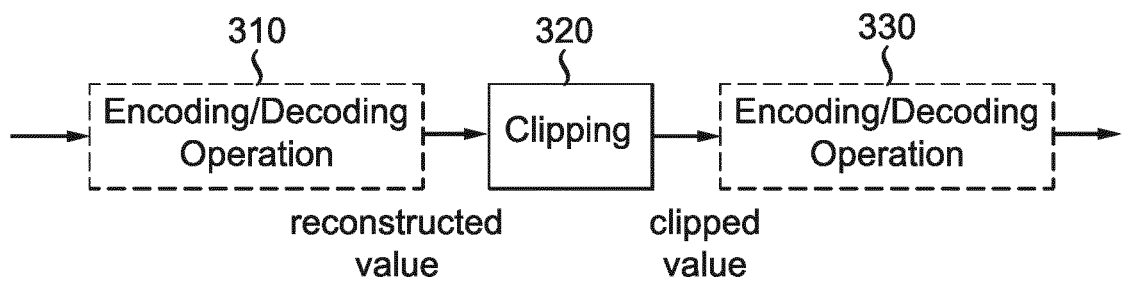
FIG. 3 illustrates input and output of a clipping operation.

As shown in FIG. 3, for ease of notation, we may refer to the input of the clipping operation as the "reconstructed value" or "reconstructed sample value," and the output of the clipping operation as the "clipped value" or "clipped sample value." Because the clipping operation (320) may be performed at different stages of the encoding or decoding process (310, 330), the reconstructed value may correspond to different data structures as described above, for example, but not limited to, the output of a deblocking filter, or the output of intra prediction. At the encoder, because of various encoding operations before the clipping, a reconstructed value may be different from the original value. By choosing a clipping bound adaptive to the video signal, the distortion between the clipped value and the original value may be smaller than the distortion between the reconstructed value and the original value, and therefore clipping may reduce the distortion in the encoding process.

The present principles are directed to adaptive clipping in video encoding and decoding. In various embodiments, we propose to determine the clipping bounds adaptive to the video signal. The various clipping embodiments may be used separately or in combination.

Lossy Clipping

Figure 4A:
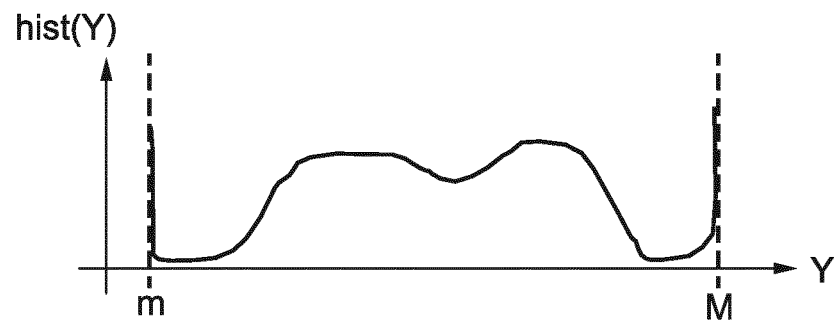
FIG. 4A is a pictorial example illustrating a histogram of an exemplary video signal with a data range of [m, M]

A histogram generally is a graphical representation of the probability distribution of sample values. FIG. 4A shows a histogram of an exemplary video signal with a data range of [m, M]. For this video signal, the histogram has high peaks at signal bounds m and M. Having peaks at signal bounds in a histogram is common for a video signal that goes through grading that purposely saturates the signal. For such a video signal, using the signal bounds as the clipping bounds may perform well in terms of reducing the signal distortion.

Figure 4B:
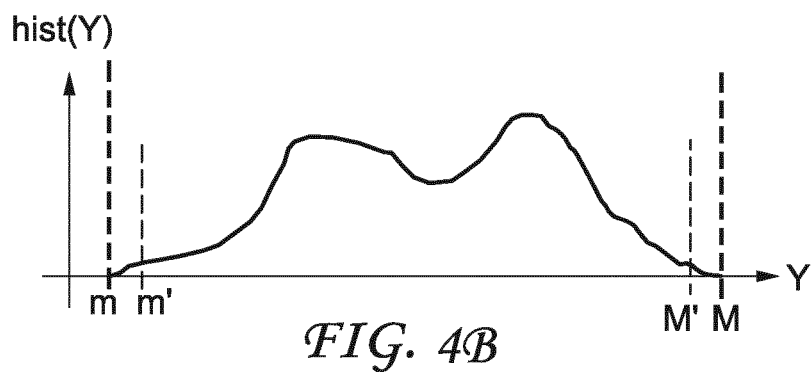
FIG. 4B is a pictorial example illustrating a histogram of another exemplary video signal with a data range of [m, M].

FIG. 4B shows a histogram of another exemplary video signal with a data range of [m, M]. In this example, there are no high peaks at the signal bounds in the histogram. For such a video signal, we may design a clipping bound that is different from the signal bound in order to reduce the distortion.

Figures 5A, 5B:
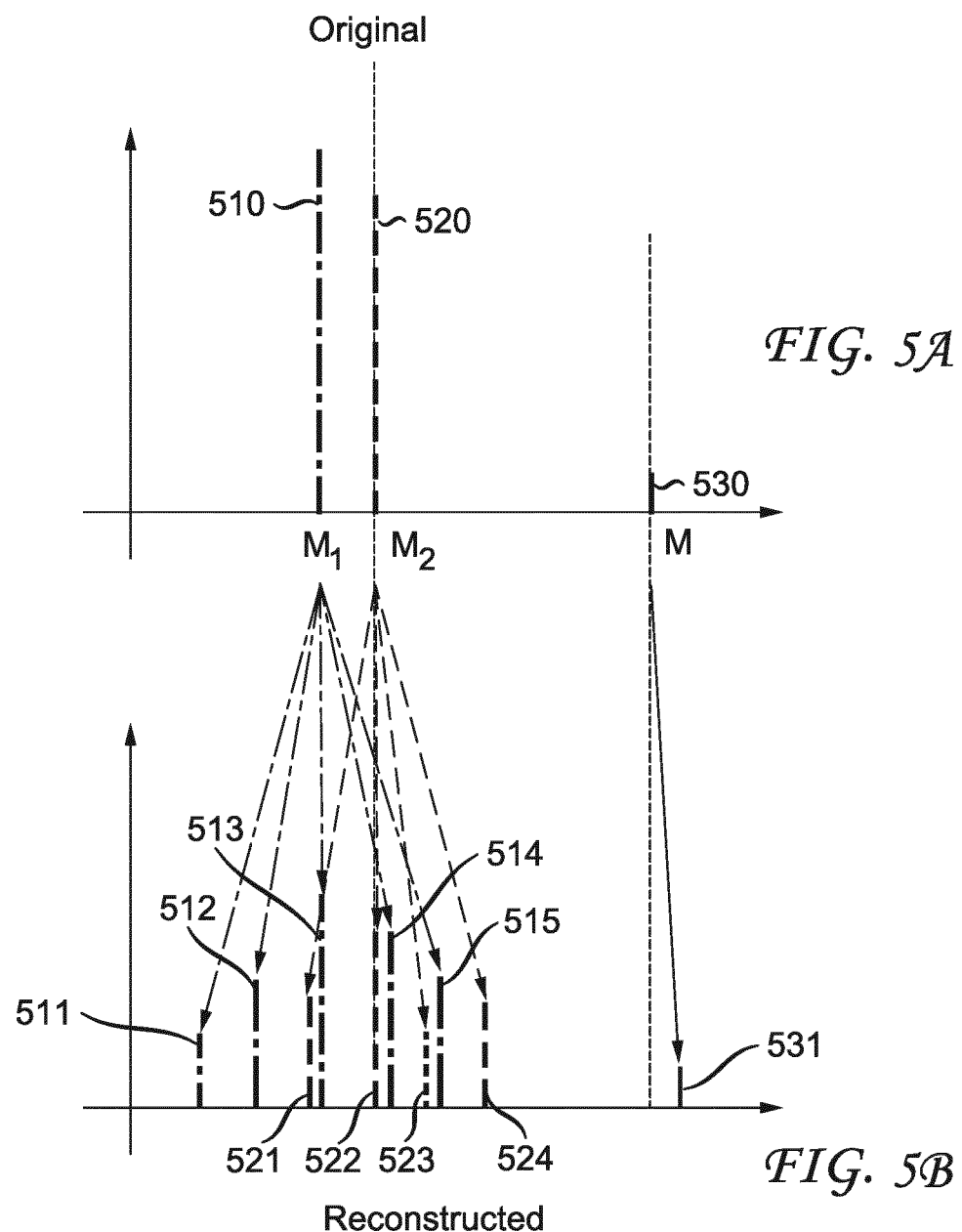
FIG. 5A is a pictorial example illustrating an exemplary histogram of original values with 3 bars.
FIG. 5B is a pictorial example illustrating an exemplary histogram of reconstructed values.

After a video signal goes through some encoding operations, a reconstructed sample value is typically distributed around the original sample value (either smaller, equal or greater), with a spread depending on the QP (Quantization Parameter). FIG. 5A illustrates a simplified exemplary histogram with 3 bars, 510, 520, 530, (i.e., the original video signal here has three possible values $M_1$, $M_2$ and M). After the video signal is encoded and reconstructed, the sample values may become smaller (from 510 to 511 or 512, or from 520 to 521), become larger (from 510 to 514 or 515, from 520 to 523 or 524, or from 530 to 531), or maintain the same (from 510 to 513, or from 520 to 522), and the histogram becomes different as shown in FIG. 5B.

FIG. 5C and FIG. 5D illustrate the resulting histograms based on different upper clipping bounds. Using signal bound M as the upper clipping bound, only reconstructed sample values at bar 531 are clipped and bar 531 moves to bar 532 as shown in FIG. 5C. Thus, when the video signal has a small probability around the signal bounds, only a few samples benefit from the clipping, in this example, samples at bar 531 are corrected.

On the other hand, using M'<M as the upper clipping bound, sample values at bars 531, 524, 515, 523 are all clipped to M'=$M_2$ (at bar 533) as shown in FIG. 5D. Here, samples at bar 531, with original value M, are clipped to M', and thus have a distortion of M−M'. Pixels at bars 523 and 524 are perfectly corrected after being clipped to M'=$M_2$. For samples at bar 515, with original values $M_1$, the distortion is smaller when being clipped to M' than if not clipped when the clipping bound is M. Because there are fewer samples at bar 531 than at bars 515, 523 and 524, the overall distortion may be decreased when the clipping bound is set to M' instead of M. In general, by choosing a clipping bound different from the signal bound, the distortion may get reduced depending on the choice of M' and the probability distribution of the video signal.

Figure 6:
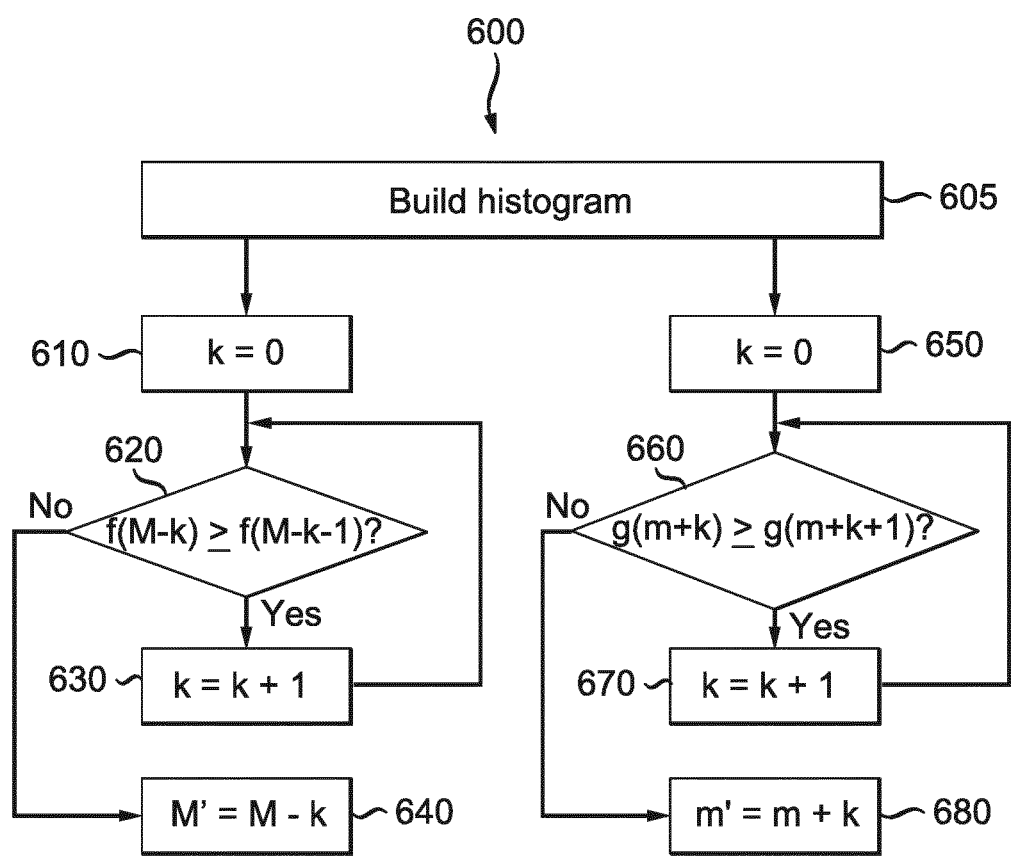
FIG. 6 illustrates an exemplary method for determining adaptive clipping bounds at an encoder, according to an embodiment of the present principles.

FIG. 6 depicts an exemplary method 600 for determining adaptive clipping bounds at an encoder, according to an embodiment of the present principles. At first, a histogram hist(Y) of the video signal is built (605), wherein a bin of the histogram may correspond to one or more sample values. In this example, the histogram is built at a slice level based on the original values. The signal bound m and M are also obtained for the video signal. At steps 610-640, the upper signal bound M and the histogram hist(Y) are used as input to decide the adaptive upper clipping bound M'. At steps 650-680, the lower signal bound m and the histogram hist(Y) are used as input to decide the adaptive lower clipping bound m'. Because the clipping bounds may be different from the signal bounds, we also refer to this clipping method as "lossy clipping."

To derive the upper clipping bound, the reconstructed sample value corresponding to original sample value Y is estimated to be Y+Δy. Thus, for original sample value Y, the clipped sample value based on a candidate upper clipping bound x is min(Y+Δy,x), and the difference between the clipped value and the original value is min(Y+Δy,x)−Y. To derive upper clipping bound M', we test the distortions using different candidate clipping values around signal bound M. The test starts with signal bound M and moves towards smaller values. The distortion may first decrease (or maintain the same) and then increase, and the turning point is chosen as clipping bound M'.

In one embodiment, variable k is initialized to 0 (k=0) (610). Then distortions at candidate clipping bounds M−k and M−k−1 are compared (620), wherein the distortion at clipping bound x can be calculated as:

$$f(x)=\Sigma_{Y=x-\Delta y}^{M}\text{hist}(Y)[\min(Y+\Delta y,x)-Y]^2. \quad (4)$$

If the distortion at M−k is larger or the same (620) than the distortion at M−k−1, k is incremented (630) by 1 (k=k+1), namely, the upper clipping bound M' moves further away from the upper signal bound M, and the loop returns to 620. Otherwise, if the distortion at M−k is smaller (620), the upper clipping bound M' is set to be M−k (640). In other embodiments, k may be incremented by the number of sample values represented in a bin of the histogram, or k may be specified by the encoder.

To derive the lower clipping bound, the reconstructed value corresponding to original value Y is estimated to be Y−Δy. Thus, for original value Y, the clipped value based on a candidate lower clipping bound x is max(Y−Δy,x), and the difference between the clipped value and the original value is max(Y−Δy,x)−Y. To derive lower clipping bound m', we test the distortions using different candidate clipping values around signal bound m. The test starts with signal bound m and moves toward larger values. The distortion first decreases (or maintains the same) and then increases, and the turning point is chosen as clipping bound m'.

In one embodiment, to derive the lower clipping bound, variable k is initialized to 0 (k=0) (650). Then distortions at candidate clipping bounds m+k and m+k+1 are compared (660), wherein the distortion at clipping bound x can be calculated as:

$$g(x)=\Sigma_{Y=m}^{x+\Delta y}\text{hist}(Y)[\max(Y-\Delta y,x)-Y]^2. \quad (5)$$

If the distortion at m+k is larger or the same (660) than the distortion at m+k+1, k is incremented (670) by 1 (k=k+1), namely, the lower clipping bound m' moves further away from the lower signal bound m, and the loop returns to 660. Otherwise, if the distortion at m+k is smaller (660), the lower clipping bound m' is set to be m+k (680).

In the above, the difference between the clipped value and the original value is used as a distortion measure to determine the clipping bounds. More generally, we can use a score to decide the bounds. For example, we may use a RD (rate-distortion) score as a distortion measure, wherein the bit rate for encoding the bound and/or the clipped value is also considered.

The value of Δy used in Eqs. (4) and (5) may be set based on the quantization parameter, for example, as Δy=α×Qstep (QP)$^2$, wherein α is a constant factor and Qstep is the quantization step size for QP. Alternatively, the value of Δy may be set based on a look-up table which provides a correspondence between QP and Δy. If there are several QPs that are used in encoding the video signal, Δy may be computed using, for example, but not limited to, the smallest QP, the highest one, or an average QP.

Method 600 can be adapted to be applied to the chrominance component of the video signal.

In the above, the clipping bounds are derived at the slice level based on the original signal. It should be noted that the clipping bounds can also be derived at block levels, for example, at the CTU level, and the clipping bounds can be derived using the reconstructed values if the reconstructed values are already available. If the reconstructed value Y' is known, the exact distortion of Y can be calculated. For example, Eq. (4) may become:

$$f(x)=\Sigma_{Y=m}^{M}\text{hist}(Y)[\min(Y',x)-Y]^2 \quad (6)$$

and Eq. (5) may become $$g(x)=\Sigma_{Y=m}^{M}\text{hist}(Y)[\max(Y',x)-Y]^2. \quad (7)$$

After the clipping bounds m' and M' are derived, a sample may be clipped with $B_L$=m' and $B_U$=M'. For a decoder to correctly decoded the sample, the clipping bounds may be transmitted in the bitstream to the decoder.

PCA Clipping

Figure 7A:
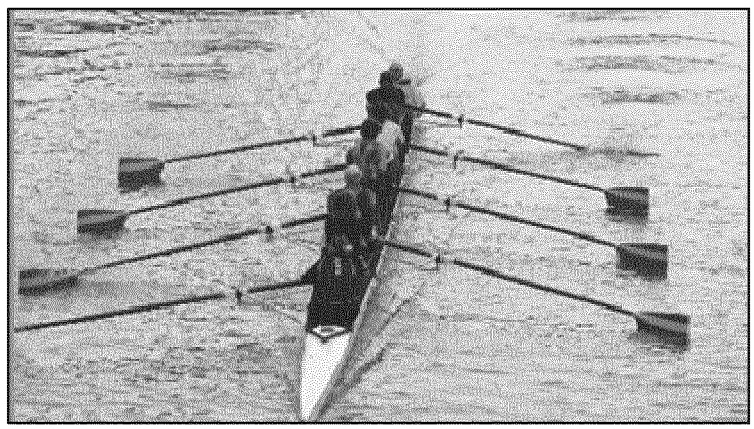
FIG. 7A shows an exemplary picture.
Figure 7B:
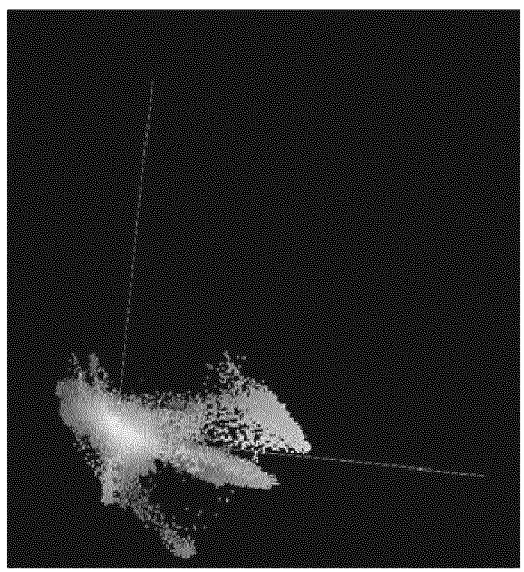
FIG. 7B shows that pixel values of the exemplary picture spread out in the YUV space.

FIG. 7B shows that sample values of an exemplary picture shown in FIG. 7A spread out in the YUV space, wherein U is the horizontal axis, and V is the vertical axis. It can be observed that along the U or V axis the sample values are not uniformly distributed and one component depends on other components. In the YUV space, clipping can be seen as limiting the sample values into a box defined by [$B_{L,Y}$, $B_{U,Y}$], [$B_{L,U}$, $B_{U,U}$], and [$B_{L,V}$, $B_{U,V}$], where $B_{L,Y}$, $B_{L,U}$ and $B_{L,V}$ are the lower clipping bounds for the Y, U, and V components respectively, and $B_{U,Y}$, $B_{U,U}$ and $B_{U,V}$ are the upper clipping bounds for the Y, U, and V components respectively. When the contour of the data spreading in the 3D YUV space is not similar to a box, the clipping may not be very effective in reducing distortion.

Assuming the signal bounds are used as the clipping bounds, the clipping box would enclose the data as shown in FIG. 7B very loosely. That is, there will be a large empty space between the data points and the clipping box. Thus, the clipping may only affect few samples and may not be very effective in reducing distortion. When lossy clipping as discussed above is used, the clipping box would be smaller than the clipping box based on the signal bounds. However, if there still is a large empty space between the data points and the tightened clipping box, the lossy clipping may still only affect a small amount of samples and may not be very effective in reducing the distortion.

Figure 7C:
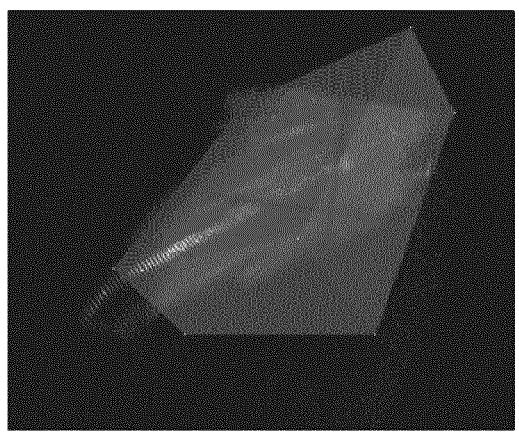
FIG. 7C shows an exemplary clipping box that is defined on a transformed space.

FIG. 7C shows that a clipping box is defined on a transformed space in order to more tightly enclose the data points, wherein the points' colors represent the sample's density (lighter colors represent fewer samples, and darker colors represent more samples). By reducing the empty space between the data points and the clipping box, clipping may reduce distortion more effectively.

In one embodiment, we propose to determine a new color space using the Principal Component Analysis (PCA) of the input data. The parameters for the color space transform may be encoded and transmitted in the bitstream. In general, the transformation applied to an input data point $X=[Y\ U\ V]^t$ can be written as:

$$\begin{bmatrix} A \\ B \\ C \end{bmatrix} = T\left(\begin{bmatrix} Y \\ U \\ V \end{bmatrix} - R_0\right) \quad (8)$$

$$\text{where } T = \begin{bmatrix} r_{11} & r_{12} & r_{13} \\ r_{21} & r_{22} & r_{23} \\ r_{31} & r_{32} & r_{33} \end{bmatrix}$$

is a linear transformation matrix and $$R_0 = \begin{bmatrix} Y_0 \\ U_0 \\ V_0 \end{bmatrix}$$

is a translation vector. The parameters for the color space transform, for example, coefficients $r_{ij}$, i,j=1, 2, 3, and $Y_0$, $U_0$ and $V_0$ can be transmitted at different levels, for example, at a slice level or CTU level. The transformation $X$ and $R_0$ can be found using, for example, a PCA decomposition of the YUV samples of the original image. ICA (Independent component analysis) can also be used instead of PCA. When using ICA, the transformed space might include more than three components if we choose to decompose on a basis larger than the initial space YUV.

After the color space transform, the clipping bounds can be determined based on the new color space at the encoder, for example, but not limited to, using the signal bounds or the bounds discussed above in lossy clipping. A sample in the transformed space then can be clipped using the boundaries $B_L$ and $B_U$ on individual components in the transformed space.

Figure 8:
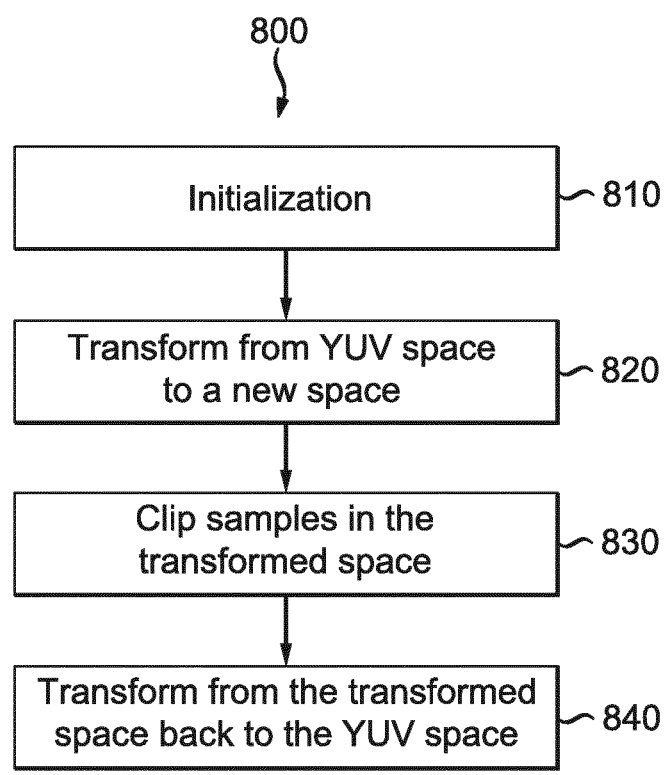
FIG. 8 shows an exemplary method for performing clipping in a transformed color space, according to an embodiment of the present principles.

FIG. 8 shows an exemplary method 800 for performing clipping in a transformed color space, according to an embodiment of the present principles. The clipping in a transformed color space may be performed at both the encoder and decoder sides. Generally the same clipping method should be used at the encoder and decoder in order to synchronize the encoder and decoder. When the clipping is performed at the encoder side, the initialization step (810) may include determining the color space transform using the PCA and determining the clipping bounds. When the clipping is performed at the decoder side, the initialization step (810) may include decoding the color space transform parameters and the clipping bounds from the bitstream.

The video signal is then transformed from the YUV color space to a new space, for example, using Eq. (8). When the clipping is performed at the encoder side, the clipping bounds ($B_{U,A}$, $B_{L,A}$, $B_{U,B}$, $B_{L,B}$, $B_{U,C}$, $B_{L,C}$) may be determined based on the transformed video signal. The samples then can be clipped (830) as:

$$A_c = \text{clip}_{B_{L,A}}^{B_{U,A}}(A),\ B_c = \text{clip}_{B_{L,B}}^{B_{U,B}}(B),\ C_C = \text{clip}_{B_{L,C}}^{B_{U,C}}(C) \quad (9)$$

where $B_{U,A}$, $B_{L,A}$ are the upper and lower clipping bounds for the A component respectively, $B_{U,B}$, $B_{L,B}$ are the upper and lower clipping bounds for the B component respectively, $B_{U,C}$, $B_{L,C}$ are the upper and lower clipping bounds for the C component respectively, $\text{clip}_{B_L}^{B_U}()$ is a clipping function based on $B_L$ and $B_U$: $\text{clip}_{B_L}^{B_U}(x)=\min(B_U,\max(B_L,x))$, and $A_c$, $B_c$, and $C_c$ are the clipped values in the new color space.

At step 840, the clipped samples are transformed from the transformed space back to the YUV space, for example, based on:

$$X_c=[Y_c\ U_c\ V_c]^t=T^{-1}(D_c+R_0) \quad (10)$$

where $X_c$ is the output clipped sample in the YUV space, $T^{-1}$ is the inverse matrix of T, $D_c=[A_c\ B_c\ C_c]^t$.

In FIG. 8, method 800 use all three color components when performing the transform. For some video signals, we notice that the Y component is often weakly correlated with the U and V color components. Thus, in some embodiments, the color transform may be applied to only two of the three color components in the YUV color space, for example, to the U and V components. In this case, clipping is applied to the U and V components independently of the Y component. This is useful when clipping is to be done on the luma and chroma independently in the codec.

Figure 9:
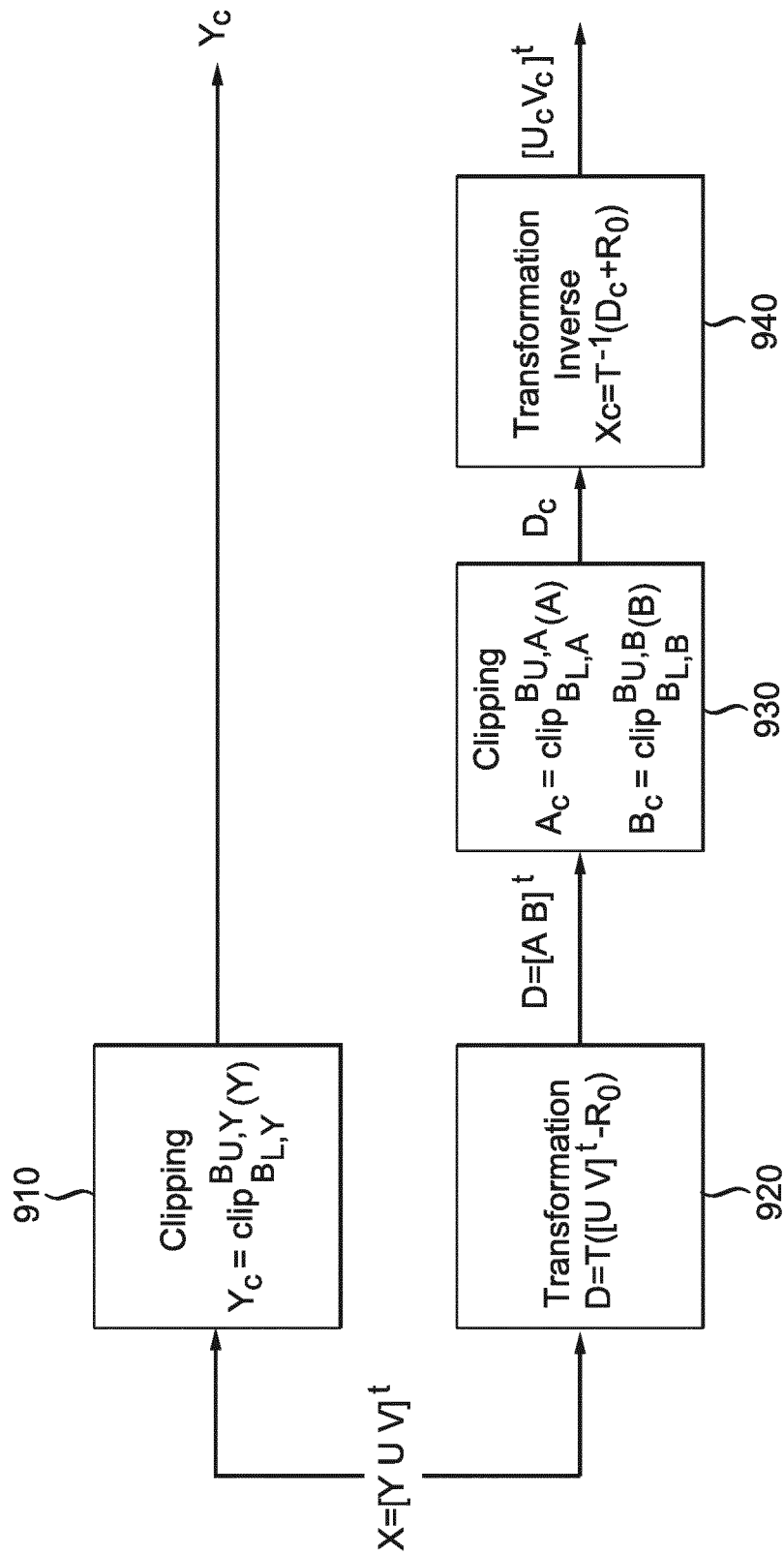
FIG. 9 shows an exemplary scheme of performing clipping of the U and V components in a transformed color space, according to an embodiment of the present principles.

FIG. 9 shows an exemplary scheme of performing clipping of the U and V components in a transformed color space, according to an embodiment of the present principles. For the Y component, the clipping (910) is still performed in the YUV color space: $Y_c=\text{clip}_{B_{L,Y}}^{B_{U,Y}}(Y)$, and $Y_c$ is the clipped value.

On the other hand, the U and V components are transformed (920) to a new space, and the transformed components $(D=[A\ B]^t=T([U\ V]^t-R_0))$ are clipped (930) in the new space as:

$$A_c=\text{clip}_{B_{L,A}}^{B_{U,A}}(A),\ B_c=\text{clip}_{B_{L,B}}^{B_{U,B}}(B). \quad (11)$$

Then, the clipped samples are transformed (940) from the new space back to the UV space:

$$[U_c\ V_c]^t=T^{-1}(D_c+R_0) \quad (12)$$

where $D_c=[A_c\ B_c]^t$.

More generally, when a color space other than YUV is used, we determine a color component that is weakly correlated with other components, for example, when a cross correlation is below a threshold. Only the other color components may be clipped in a transformed space, and the weakly correlated color component may be clipped without color space transformation.

In the above, we describe deriving lower and upper clipping bounds or applying the clipping operation based on the lower and upper clipping bounds. In different variations, we may derive the bound or perform the clipping operation just for the lower or upper clipping bound. Referring back to FIG. 4B or FIG. 6, we may derive the lossy bound for the upper bound, and use the signal bound for the lower bound, or we may derive the lossy bound for the lower bound, and use the signal bound for the upper bound. To synchronize the encoder and decoder, the same clipping operation usually should be applied at the encoder and decoder.

Various embodiments are described with respect to the HEVC standard. However, the present principles are not limited to HEVC, and can be applied to other standards, recommendations, and extensions thereof. The clipping operation may be used at different modules, for example, but not limited to, intra prediction module (160, 260), in-loop filters (165, 265), and motion compensation module (170, 275), in an encoder or decoder.

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the number of samples used in a bin in the histogram. It should be noted that the specific values are for exemplary purposes and the present principles are not limited to these specific values. In addition, when the above discussions use YUV videos as examples, the present principles can also be applied to different video formats, in different bit depths or color space.

Figure 10:
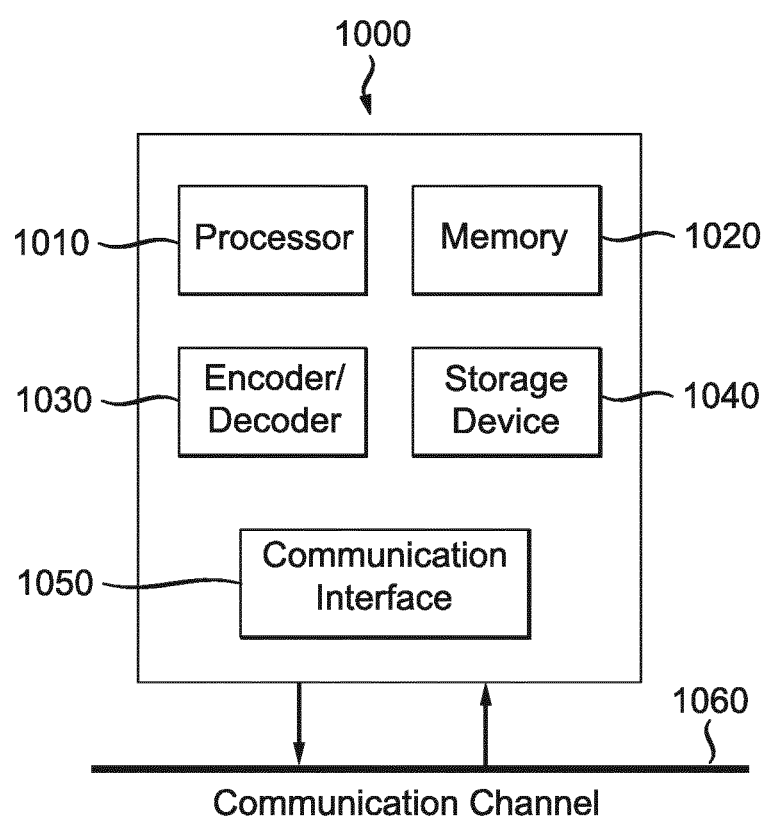
FIG. 10 illustrates a block diagram of an exemplary system in which various aspects of the exemplary embodiments of the present principles may be implemented.

FIG. 10 illustrates a block diagram of an exemplary system in which various aspects of the exemplary embodiments of the present principles may be implemented. System 1000 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 1000 may be communicatively coupled to other similar systems, and to a display via a communication channel as shown in FIG. 10 and as known by those skilled in the art to implement the exemplary video system described above.

The system 1000 may include at least one processor 1010 configured to execute instructions loaded therein for implementing the various processes as discussed above. Processor 1010 may include embedded memory, input output interface and various other circuitries as known in the art. The system 1000 may also include at least one memory 1020 (e.g., a volatile memory device, a non-volatile memory device). System 1000 may additionally include a storage device 1040, which may include non-volatile memory, including, but not limited to, EEPROM, ROM, PROM, RAM, DRAM, SRAM, flash, magnetic disk drive, and/or optical disk drive. The storage device 1040 may comprise an internal storage device, an attached storage device and/or a network accessible storage device, as non-limiting examples. System 1000 may also include an encoder/decoder module 1030 configured to process data to provide an encoded video or decoded video.

Encoder/decoder module 1030 represents the module(s) that may be included in a device to perform the encoding and/or decoding functions. As is known, a device may include one or both of the encoding and decoding modules. Additionally, encoder/decoder module 1030 may be implemented as a separate element of system 1000 or may be incorporated within processors 1010 as a combination of hardware and software as known to those skilled in the art.

Program code to be loaded onto processors 1010 to perform the various processes described hereinabove may be stored in storage device 1040 and subsequently loaded onto memory 1020 for execution by processors 1010. In accordance with the exemplary embodiments of the present principles, one or more of the processor(s) 1010, memory 1020, storage device 1040 and encoder/decoder module 1030 may store one or more of the various items during the performance of the processes discussed herein above, including, but not limited to the base layer input video, the enhancement layer input video, equations, formula, matrices, variables, operations, and operational logic.

The system 1000 may also include communication interface 1050 that enables communication with other devices via communication channel 1060. The communication interface 1050 may include, but is not limited to a transceiver configured to transmit and receive data from communication channel 1060. The communication interface may include, but is not limited to, a modem or network card and the communication channel may be implemented within a wired and/or wireless medium. The various components of system 1000 may be connected or communicatively coupled together using various suitable connections, including, but not limited to internal buses, wires, and printed circuit boards.

The exemplary embodiments according to the present principles may be carried out by computer software implemented by the processor 1010 or by hardware, or by a combination of hardware and software. As a non-limiting example, the exemplary embodiments according to the present principles may be implemented by one or more integrated circuits. The memory 1020 may be of any type appropriate to the technical environment and may be implemented using any appropriate data storage technology, such as optical memory devices, magnetic memory devices, semiconductor-based memory devices, fixed memory and removable memory, as non-limiting examples. The processor 1010 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for processing video data, comprising:
accessing a video signal having a first color component, a second color component, and a third color component in a first color space;
encoding or decoding parameters for transforming;
transforming the second color component and the third color component into a transformed second color component and a transformed third color component independent of the first color component, responsive to the parameters for transforming, wherein each of the transformed second and third color components depends on both of the second and third color components;
clipping sample values of the transformed second color component and the transformed third color component;
inverse transforming the clipped sample values of the transformed second color component and the transformed third color component; and
clipping sample values of the first color component in the first color space.

2. The method of claim 1, wherein the sample values in the first color component are less correlated with the sample values in the second color component and the third color component.

3. The method of claim 1, wherein the first color component is a luma component, and the second and third color components are chroma components.

4. The method of claim 1, wherein the first, second and third color components are Y, U, V, respectively.

5. The method of claim 1, wherein the transforming is based on PCA (Principal Component Analysis).

6. The method of claim 1, wherein the clipping is performed at an encoder or decoder.

7. The method of claim 1, wherein the clipping is performed using at least one of an upper clipping bound and a lower clipping bound.

8. The method of claim 1, comprising:
determining one or more distortions, using one or more values adjacent to a signal bound as corresponding candidate clipping bounds, wherein each of the one or more distortions is based on a corresponding candidate clipping bound, and wherein the distortions first decrease or maintain the same and then increase, as a distance between the candidate clipping bound and the signal bound increases; and
determining the candidate clipping bound where the distortions start to increase as a clipping bound for at least one of the first, second and third color components of the video signal.

9. The method of claim 8, wherein each of the one or more distortions is based on a difference between original values of the video signal and reconstructed values of the video signal after being clipped by the corresponding candidate clipping bound.

10. An apparatus for processing video data, comprising at least one memory and one or more processors configured to:
access a video signal having a first color component, a second color component, and a third color component in a first color space;
encode or decode parameters for transforming;
transform the second color component and the third color component into a transformed second color component and a transformed third color component independent of the first color component, responsive to the parameters for transforming, wherein each of the transformed second and third color components depends on both of the second and third color components;
clip sample values of the transformed second color component and the transformed third color component;
inverse transform the clipped sample values of the transformed second color component and the transformed third color component; and
clip sample values of the first color component in the first color space.

11. The apparatus of claim 10, wherein the sample values in the first color component are less correlated with the sample values in the second color component and the third color component.

12. The apparatus of claim 10, wherein the first color component is a luma component, and the second and third color components are chroma components.

13. The apparatus of claim 10, wherein the first, second and third color components are Y, U, V, respectively.

14. The apparatus of claim 10, wherein the transforming is based on PCA (Principal Component Analysis).

15. The apparatus of claim 10, wherein the clipping is performed at an encoder or decoder.

16. The apparatus of claim 10, wherein the clipping is performed using at least one of an upper clipping bound and a lower clipping bound.

17. The apparatus of claim 10, wherein the one or more processors are further configured to:
- determine one or more distortions, using one or more values adjacent to a signal bound as corresponding candidate clipping bounds, wherein each of the one or more distortions is based on a corresponding candidate clipping bound, and wherein the distortions first decrease or maintain the same and then increase, as a distance between the candidate clipping bound and the signal bound increases; and
- determine the candidate clipping bound where the distortions start to increase as a clipping bound for at least one of the first, second and third color components of the video signal.

18. A non-transitory computer readable storage medium having stored thereon instructions for processing video data, when executed, implement a method, the method comprising:
- accessing a video signal having a first color component, a second color component, and a third color component in a first color space;
- encoding or decoding parameters for transforming;
- transforming the second color component and the third color component into a transformed second color component and a transformed third color component independent of the first color component, responsive to the parameters for transforming, wherein each of the transformed second and third color components depends on both of the second and third color components;
- clipping sample values of the transformed second color component and the transformed third color component;
- inverse transforming the clipped sample values of the transformed second color component and the transformed third color component; and
- clipping sample values of the first color component in the first color space.

19. The medium of claim 18, wherein the sample values in the first color component are less correlated with the sample values in the second color component and the third color component.

20. The medium of claim 18, wherein the transforming is based on PCA (Principal Component Analysis).

* * * * *